Oct. 28, 1952  S. M. BAGNO  2,615,970
DUMMY INTRUDER FOR INTRUDER DETECTION SYSTEMS
Filed Sept. 12, 1951  2 SHEETS—SHEET 1

INVENTOR.
SAMUEL M. BAGNO
BY James and Franklin
ATTORNEYS

Oct. 28, 1952 S. M. BAGNO 2,615,970
DUMMY INTRUDER FOR INTRUDER DETECTION SYSTEMS
Filed Sept. 12, 1951 2 SHEETS—SHEET 2

INVENTOR.
SAMUEL M. BAGNO
BY James and Franklin
ATTORNEYS

Patented Oct. 28, 1952

2,615,970

UNITED STATES PATENT OFFICE 2,615,970

DUMMY INTRUDER FOR INTRUDER DETECTION SYSTEMS

Samuel M. Bagno, Astoria, N. Y., assignor to The Alertronic Protective Corporation of America, New York, N. Y., a corporation of New York Application September 12, 1951, Serial No. 246,280

11 Claims. (Cl. 177—352)

The present invention relates to an instrumentality for testing the functioning of an intruder detection apparatus, and more particularly to testing the functioning of such an apparatus which detects motion through the reflection from a moving object of radiations of a predetermined frequency.

In my copending application Serial No. 776,368 filed September 26, 1947 and entitled "Method and Apparatus for Detecting Motion in a Confined Space," an intruder detecting system is disclosed consisting of a transmitter which substantially fills an enclosed space with radiations at a supersonic frequency, those radiations being reflected from the walls of a room and the objects in a room and then being picked up by a receiver. The receiver is so designed as to have an output effective to set off an alarm only when frequencies other than the transmitted frequencies are detected by it. These difference frequencies are produced either through movement in the room of a radiation-reflecting object or movement within the room of a portion of the air through which at least some of the transmitted radiations passes, that movement having a Doppler effect on the transmitted frequency, thus causing at least part of the input to the receiver to differ from the transmitted frequency.

In intruder detection apparatus, and particularly in such apparatus which is adapted to give an alarm at a central monitoring station, some means are desirable in order that an attendant in the monitoring station can test the operability of the detection apparatus from time to time.

With detection apparatus of the type specifically under discussion, its operability can be positively tested by setting up a dummy intruder within the space being protected by the detecting apparatus, that is to say, by setting up in that space a device which can be actuated at a remote station and which will produce an effect which is comparable to the motion of an intruder therein. This can either be done by artificially moving some radiation-reflecting element within the space at a rate comparable to that which would characterize an intruder or by setting up a comparable air turbulence effect, either of these actions causing a portion of the transmitted radiations to alter in frequency insofar as the receiver is concerned. Hence whenever the dummy intruder is actuated, the alarm will be set off so long as the system is in proper operating condition. It is important to note that the test thus produced is an overall system test, effective to simultaneously check all of the components of the detecting equipment as well as the basic condition of the space protected by the apparatus. This is far superior to other testing methods which only check portions of the protected equipment.

The dummy intruder of the present invention is extremely compact, takes up no substantial additional space, may be unobtrusively positioned within the space being protected, and gives an immediate indication of the condition of the protective apparatus.

To the accomplishment of the above and to such other objects as may hereinafter appear, the present invention relates to the design and construction of a dummy intruder for a detection system of the type under discussion as defined in the appended claims and as described in this specification, taken together with the drawings in which:

Figure 1:
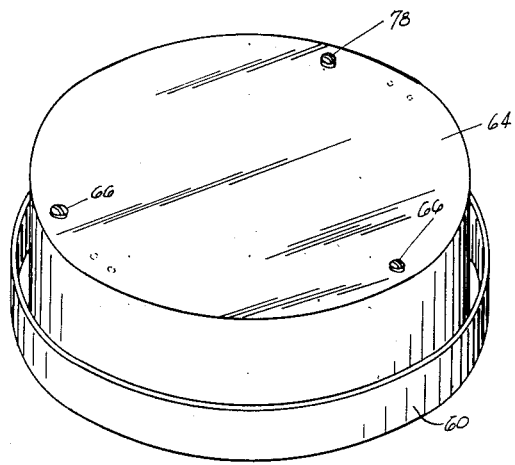
Fig. 1 is a three-quarter perspective view of one type of transducer unit which may be employed in the detection apparatus.

In the form here specifically disclosed the dummy intruder consists of a vane 2 mounted on the shaft 4 of a motor 6 and adapted to be rotated by that motor so as to move at a speed comparable to the detectable motion of an intruder. The vane 2 is operatively positioned in a path of the radiations of a given high frequency, the vane 2 either being directly in that path so as to itself reflect transmitted radiations and impart to them a Doppler effect difference frequency, or else being indirectly in that path, imparting a Doppler effect by causing air turbulences of a magnitude sufficient to similarly affect a part of the transmitted radiations. In either event, whenever the vane 2 is rotated at appropriate speed, the detection system, if it is operating properly, will have the same type of effective output as if an intruder were actually in the room.

This output, usually in the form of an electrical signal, may be fed to the coil 8 of the master control unit 14, that coil thus being energized to attract relay armature 12 which in turn controls a circuit extending to the remote monitoring station 14 so as to set off an alarm at that station.

Figure 4:
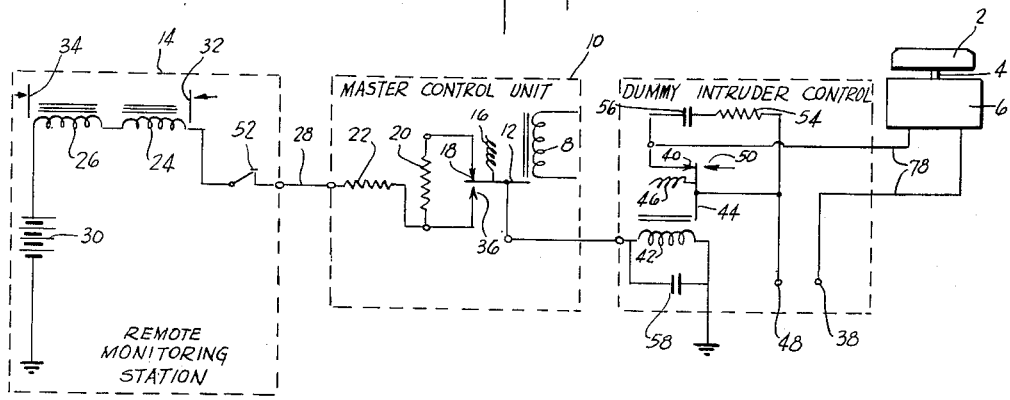
Fig. 4 is a schematic circuit diagram illustrating one mode of connection of the dummy intruder for actuation from a remote monitoring station.

The circuit of Fig. 4 illustrates a typical arrangement by means of which the alarm at the remote monitoring station 14 is energized. The armature 12 is urged by spring 16 to a position in which that armature makes electrical connection with contact 18, thus putting resistors 20 and 22 in circuit with the relay coils 24 and 26 at the remote monitoring station 14, those coils being connected to the master control unit by means of line 28 which may be a telephone line or the like. A battery 30 is connected between ground and the coil 26, and the armature 12 is in turn connected to ground. The relay coils 24 and 26 respectively control armatures 32 and 34, the relays 24, 32 and 26, 34 being sensitive to different values of current in the circuit. When the armature 12 is in its normal position engaging contact 18 a low value of current will flow in the circuit because both of the resistors 20 and 22 are included therein. This will cause the low current relay 26, 34 to close, thus indicating in some manner, as by lighting a white light at the remote station 14, that the circuit to the master control unit, which is located in or near the premises being protected, is in good working order. When the detection system under discussion senses a frequency difference from the transmitted basic frequency the coil 8 will be energized and the armature 12 will be moved thereby against the action of the spring 16 so as to move away from contact 18 and engage contact 36. When this occurs only resistor 22 is in the circuit, a higher value of current will flow in the circuit, and the high current relay 24, 32 will be actuated, this relay indicating the detection of an intruder by, for example, turning on a red light and ringing a bell at the remote station 14.

As here specifically disclosed, the motor 6, which may be an alternating current self-starting shaded pole synchronous motor operating on six volts, has one of its terminals connected to one side 38 of a six-volt alternating current source. Its other terminal is connected to contact 40 of a relay defined by coil 42 and armature 44, a spring 46 normally moving the armature 44 so as to make electrical engagement with the contact 40, the armature 44 in turn being connected to the other side 48 of the six-volt A. C. source. Thus, when the coil 42 is not energized, the circuit to the motor 6 will be closed and the motor will rotate, thus causing the vane 2 to move. When the coil 42 is energized the armature 44 will move away from contact 40 and into engagement with blind contact 50, thus opening the circuit to the motor 6 and causing it to stop. The coil 42 is connected between ground and the armature 12 and therefore will be energized, and the motor 6 will be stationary, so long as the circuit to the remote monitoring station 14 is complete. An actuating means defined, for example, by a circuit breaking push button 52, is included in that circuit at the remote monitoring station 14, and whenever that push button is depressed so as to break the circuit in which it is included, the coil 42 will be de-energized and the motor 6 will start to rotate, thus causing the vane 2 to rotate and setting up in the premises being protected a physical condition comparable to that which would be set up by the motion of an actual intruder. Hence the coil 8 is energized and the armature 12 will move from contact 18 and engage contact 36.

Of course, while the push button 52 is depressed to open its circuit no alarm indication can be received at the monitoring station 14. However, when the push button 52 is released the circuit to the monitoring station 14 is once again established. Release of the push button 52 will energize the coil 42 and thus will terminate the driving force exerted on the motor 6, but the momentum of the moving parts of that motor and of the vane 2 will cause the motor and the vane to continue to rotate for an appreciable period of time after the circuit to its source of supply 38, 48 has been broken. This period of time, on the order of three seconds, is ample to permit the high current relay 24, 32 to be actuated and thus indicate at the monitoring station 14 that the detecting system is in proper working order. In addition, the operation of the receiver and of the master control unit 10 is usually such as to have an inherent time lag once motion has been detected and the coil 8 has been energized. In other words, once the armature 12 has been moved into engagement with the contact 36, several seconds will elapse before it resets. Hence, even if the motor 6 were to cease operating immediately upon release of the push button 52, the master control unit 10 would remain energized for a sufficient period of time for the indication of an alarm at the monitoring station 14.

The electrical components of the detecting apparatus may well be sensitive to electrical interference, and consequently resistor 54 and capacitor 56, which may have the values of 100 ohms and .1 microfarad respectively, are connected between the contact 40 and one side 48 of the A. C. source 6, this network having the effect of inhibiting sparking within the motor.

It is often desirable to provide some means whereby a signal can be transmitted from the premises being protected to the monitoring station 14, this signal being used, for instance, to notify the monitoring station 14 that the premises have been legitimately reoccupied. This signal is conventionally accomplished by breaking the circuit to the monitoring station 14 momentarily at the premises being protected. In order to prevent this momentary breaking of the circuit from actuating the dummy intruder, it has sometimes been found useful to connect a comparatively large condenser 58 across the coil 42. This condenser may have a magnitude of 1000 microfarads and will act as a time delay network preventing de-energization of the coil 42 upon momentary breaking of the circuit but permitting the coil 42 to become de-energized if the circuit is broken for an appreciable period of time such as, for example, one or two seconds. When the condenser 58 is in the circuit it will of course be necessary, if actuation of the dummy intruder is desired, to depress the push button 52 at the remote station 14 for that appreciable period of time, but this situation is of course known to the attendant at the monitoring station 14 and hence does not constitute a drawback.

Figures 2, 3:
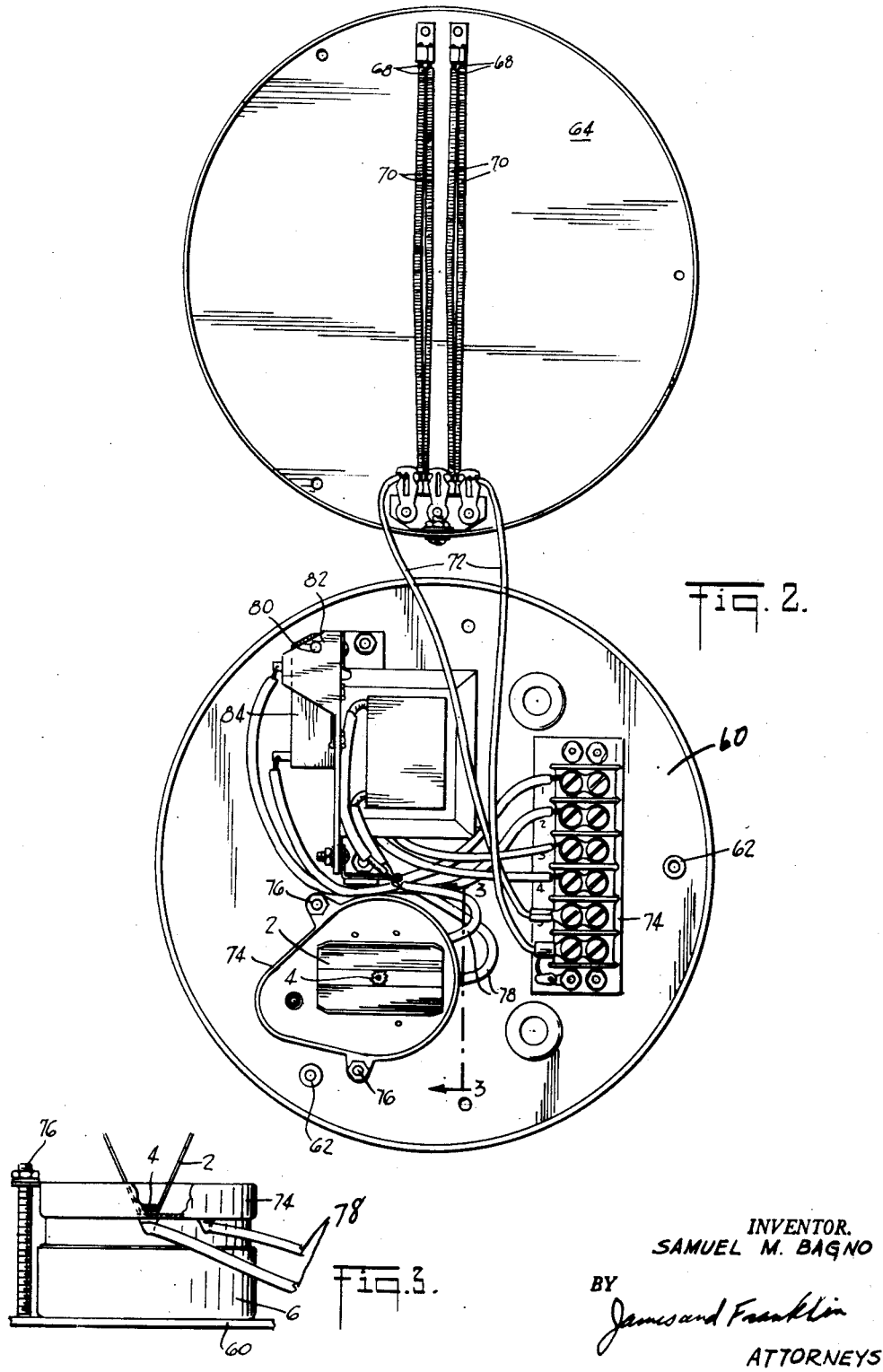
Fig. 2 is a top plan view of that transducer with the cover removed and inverted, showing one manner of mounting the dummy intruder.
Fig. 3 is a front elevational view, partially broken away, of the dummy intruder unit.

Figs. 1, 2 and 3 illustrate an actual installation of the dummy intruder. Fig. 1 represents one of the transducers, and preferably the transmitter, used in the detection system and mounted at some point within the premises to be protected. It comprises a mounting pan 60 having spacer sleeves 62 extending upwardly therefrom on which a dish-like diaphragm 64 is mounted by means of screws 66. Magnetostriction rods 68 mounted within coils 70 have their ends secured to appropriate spaced points on the diaphragm 64 so that when the coils 70 are supplied with varying current through leads 72 extending from terminal block 74, the diaphragm will be caused to vibrate accordingly. Of course, if the transducer should be operating as a receiver vibrations of the diaphragm 64 will generate current variations in the coil 70.

The motor 6 is mounted on the support pan and its shaft 4 extends through housing 74 which is secured to the pan 60 by means of screws 76. The vane 2, which may be two inches in length and defined by a pair of angularly upstanding sheets having an area of approximately 1½ square inches, is mounted on the shaft 4 so as to rotate within the housing 74, that housing having an open top. Leads 78 extend from the motor to the terminal block 74 so that connection may be made to the dummy intruder control relay contact 40 and the side 38 of the six-volt A. C. source.

This manner of mounting of the dummy intruder has several definite advantages. In the first place, the vane 2 is positioned very close to the source of radiation and hence there is no doubt but that rotation of the vane 2 will affect those radiations and will impart a Doppler effect difference frequency to at least a portion of them. In the second place, the dummy intruder is completely covered, thus not only lengthening its effective life but also hiding it from view of a would-be intruder who might wish to disable the detection apparatus and would also have to disable the dummy intruder in order to prevent the monitoring station 14 from becoming aware of the fact that the system was not operating properly. In this regard it might be pointed out that the third screw 78 which holds the diaphragm 64 onto the support pan 60 is not received by a spacer sleeve 62 but instead passes through aperture 80 in bracket 82, a leaf 84 being mounted directly under the aperture 80 so as to be depressed by the tip of the screw 78 and actuate a suitable switch. This assembly functions as a tamper-indicator—whenever the screw 78 is removed from the aperture 80, as is necessary if access to the dummy intruder is desired, circuit connections will be set up which will indicate in the remote monitoring station 14 that tampering has taken place.

While the dummy intruder could be mounted either in a receiver or the transmitter, it is preferred to mount it in the transmitter, since receiver mounting might under certain circumstances cause the electrical components of the receiver to pick up electrical noises in the power line to the motor 6, thus adversely effecting its operation.

When mounted as here disclosed, the vanes 2 not only act as a direct reflector of radiations, but also set up a marked air turbulence which has a similar effect insofar as generating Doppler difference frequencies are concerned. Thus the use of angular vanes affects the transmitted radiations according to both modes of operation as previously set forth.

While the system shown in Fig. 4 requires circuit interruption in order to energize the dummy intruder control means, it will be obvious that by appropriate circuit design well within the skill of those versed in the art any type of signal might be employed for that purpose, including a radio frequency signal or other modulation impressed on the circuit shown in Fig. 4, the use of a signal of a particular frequency with respect to which the relay 42, 44, or any other dummy intruder control means may be sensitive, or reversal of the polarity of the circuit.

If a single large space is being protected by a number of sets of transmitters and receivers, testing from the remote monitoring station may be carried out according to the above disclosure by utilizing a timing motor which, when actuated by the signal from the monitoring station 14, would sequentially energize one and then another of the relays 42, 44, each of which would control the dummy intruder of a particular set of transmitters and receivers. The timing motor might simultaneously automatically switch resistances of predetermined values into the line of the monitoring station 14 so that the operator at that station can identify the set being tested at any moment.

It will be apparent that many variations may be made in the above disclosure without departing from the spirit of the invention as defined in the following claims.

I claim:

1. In an intruder detecting system including means for transmitting radiations of a given high frequency, means for receiving those radiations and means for indicating the motion of an intruder through the detection of a change in frequency; a dummy intruder comprising a movable element positioned in a path of said radiations and capable when moved of imparting a Doppler effect frequency to at least a portion of said radiations, means operatively connected to said element for moving it at a rate comparable to the detectable motion of an intruder, and independently actuatable control means for starting and stopping said moving means.

2. In an intruder detecting system including means for transmitting radiations of a given high frequency, means for receiving those radiations and means for indicating the motion of an intruder through the detection of a change in frequency; a dummy intruder comprising a movable element positioned in a path of said radiations and capable when moved of imparting a Doppler effect frequency to at least a portion of said radiations, means operatively connected to said element for moving it at a rate comparable to the detectable motion of an intruder, and control means independently actuatable from a point remote from said system and operatively connected to said moving means for starting and stopping said moving means.

3. In an intruder detecting system including means for transmitting radiations of a given high frequency, means for receiving those radiations and means for indicating the motion of an intruder through the detection of a change in frequency, said system including a remote station where alarms are given when the system detects such motion; a dummy intruder comprising a movable element positioned in a path of said radiations and capable when moved of imparting a Doppler effect frequency to at least a portion of said radiations, means operatively connected to said element for moving it at a rate comparable to the detectable motion of an intruder, and control means independently actuatable at said remote station and operatively connected to said moving means for starting and stopping said moving means.

4. In an intruder detecting system including transducers for transmitting radiations of a given high frequency and receiving those radiations, and means for indicating the motion of an intruder through the detection of a change in frequency; a casing for one of said transducers, a movable element, capable when moved of imparting a Doppler effect frequency to at least a portion of said radiations, positioned within said transducer casing, means operatively connected to said element for moving it at a rate comparable to the detectable motion of an intruder, and independently actuatable control means operatively connected to said moving means for starting and stopping said moving means.

5. In an intruder detecting system including transducers for transmitting radiations of a given high frequency and receiving those radiations, and means for indicating the motion of an intruder through the detection of a change in frequency, said system including a remote station where alarms are given when the system detects such motion; a casing for one of said transducers, a movable element, capable when moved of imparting a Doppler effect frequency to at least a portion of said radiations, positioned within said transducer casing, means operatively connected to said element for moving it at a rate comparable to the detectable motion of an intruder, and control means independently actuatable at said remote station operatively connected to said moving means for starting and stopping said moving means.

6. In an intruder detecting system including transducers for transmitting radiations of a given high frequency and receiving those radiations, and means for indicating the motion of an intruder through the detection of a change in frequency; a casing for one of said transducers, a rotatable vane, capable when moved of imparting a Doppler effect frequency to at least a portion of said radiations, positioned within said transducer casing, a motor operatively connected to said vane for rotating the latter when said motor is energized, and independently actuatable control means operatively connected to said motor for starting and stopping said motor.

7. In an intruder detecting system including transducers for transmitting radiations of a given high frequency and receiving those radiations, and means for indicating the motion of an intruder through the detection of a change in frequency, said system including a remote station where alarms are given when the system detects such motion; a casing for one of said transducers, a rotatable vane, capable when moved of imparting a Doppler effect frequency to at least a portion of said radiations, positioned within said transducer casing, a motor operatively connected to said vane for rotating the latter when said motor is energized, and control means independently actuatable at said remote station operatively connected to said motor for starting and stopping said motor.

8. In an intruder detecting system including means for transmitting radiations of a given high frequency, means for receiving those radiations and means for detecting the motion of an intruder through the detection of a change in frequency; an alarm at a station remote from said indicating means, an electrical circuit between said indicating means and said alarm, actuating means at said remote station for changing the degree of current flow in said circuit, an electrically controlled switch at the locality where detection takes place, said switch being electrically connected to said circuit and responsive to changes in current flow therein, a motor energization of which is operatively controlled by said switch so that when said switch is in a condition corresponding to one degree of current flow in said circuit said motor is de-energized and when said switch is in a condition corresponding to another degree of current flow in said circuit said motor is energized, and an element capable when moved of imparting a Doppler effect frequency to at least a portion of said radiations, positioned in a path of said radiations and operatively connected to said motor so as to be moved thereby at a rate comparable to the detectable motion of an intruder when said motor is energized.

9. In the system of claim 8, a time delay circuit associated with said switch and effective to prevent its actuation upon changes in the current flow through said circuit which are of short duration.

10. In an intruder detecting system including means for transmitting radiations of a given high frequency, means for receiving those radiations and means for indicating the motion of an intruder through the detection of a change in frequency; an alarm at a station remote from said indicating means, an electrical circuit between said indicating means and said alarm, actuating means at said remote station for interrupting the current flow in said circuit, an electrically controlled switch at the locality where detection takes place, said switch being electrically connected to said circuit and responsive to the presence or absence of current flow therein, a motor energization of which is operatively controlled by said switch so that when said switch is in a condition corresponding to current flow in said circuit said motor is de-energized and when said switch is in a condition corresopnding to an interruption of current flow in said circuit said motor is energized, and an element capable when moved of imparting a Doppler effect frequency to at least a portion of said radiations, positioned in a path of said radiations and operatively connected to said motor so as to be moved thereby at a rate comparable to the detectable motion of an intruder when said motor is energized.

11. In the system of claim 9, a time delay circuit associated with said switch and effective to prevent its actuation upon interruptions of the current flow through said circuit which are of short duration.

SAMUEL M. BAGNO.

REFERENCES CITED

The following references are of record in the file of this patent:

UNITED STATES PATENTS

| Number | Name | Date |
| --- | --- | --- |
| 1,192,312 | Hopkins et al. | July 25, 1916 |
| 1,547,873 | Hopkins | July 28, 1925 |